US005263682A

United States Patent [19]

Covert et al.

[11] Patent Number: 5,263,682

[45] Date of Patent: Nov. 23, 1993

[54] VALVE STEM PACKING SYSTEM

[75] Inventors: Douglas A. Covert, Painesville; Peter C. Williams, Cleveland Hts., both of Ohio

[73] Assignee: Whitey Co., Highland Hts., Ohio

[21] Appl. No.: 852,649

[22] Filed: Mar. 17, 1992

[51] Int. Cl.[5] .......................... F16K 41/04; F16J 15/24

[52] U.S. Cl. .......................................... 251/214; 73/46; 137/312; 222/108; 277/2; 277/112; 277/116.2; 277/121; 277/125; 277/190

[58] Field of Search ........................ 137/312; 251/214; 277/2, 65, 110, 112, 117, 119, 121, 125, 108, 116.2, 190; 73/40, 40.5 R, 46; 222/108, 110

[56] References Cited

U.S. PATENT DOCUMENTS

| | | | |
|---|---|---|---|
| 589,725 | 9/1897 | Hodge et al. | 251/214 |
| 3,319,647 | 5/1967 | Morain | 137/312 |
| 3,770,247 | 11/1973 | Nelson | 251/214 |
| 4,010,769 | 3/1977 | De Lorenzo et al. | 137/312 |
| 4,260,131 | 4/1981 | Kindersley | 251/214 |
| 4,538,790 | 9/1985 | Williams et al. | 251/214 |
| 4,558,874 | 12/1985 | Williams et al. | 251/214 |
| 4,660,591 | 4/1987 | Brown et al. | 251/214 |
| 4,916,938 | 4/1990 | Aikin et al. | 277/2 |
| 4,972,867 | 11/1990 | Ruesch | 27/2 |
| 5,129,624 | 7/1992 | Icenhower et al. | 251/214 |

*Primary Examiner*—George L. Walton

*Attorney, Agent, or Firm*—Fay, Sharpe, Beall, Fagan, Minnich & McKee

[57] ABSTRACT

A packing system for the operating stem of rotary valves includes first and second packing assemblies engaged with the stem at axially spaced locations. The first assembly is adjustably compressed into sealing engagement with the stem by a first packing nut which carries both the second packing assembly and a second packing nut for adjustably compressing the second packing assembly into sealing engagement with the stem independently of the first packing assembly. The space between the first and second packing assemblies provides a sealed chamber to allow detecting any leakage taking place from the valve chamber through the first stem packing assembly.

4 Claims, 2 Drawing Sheets

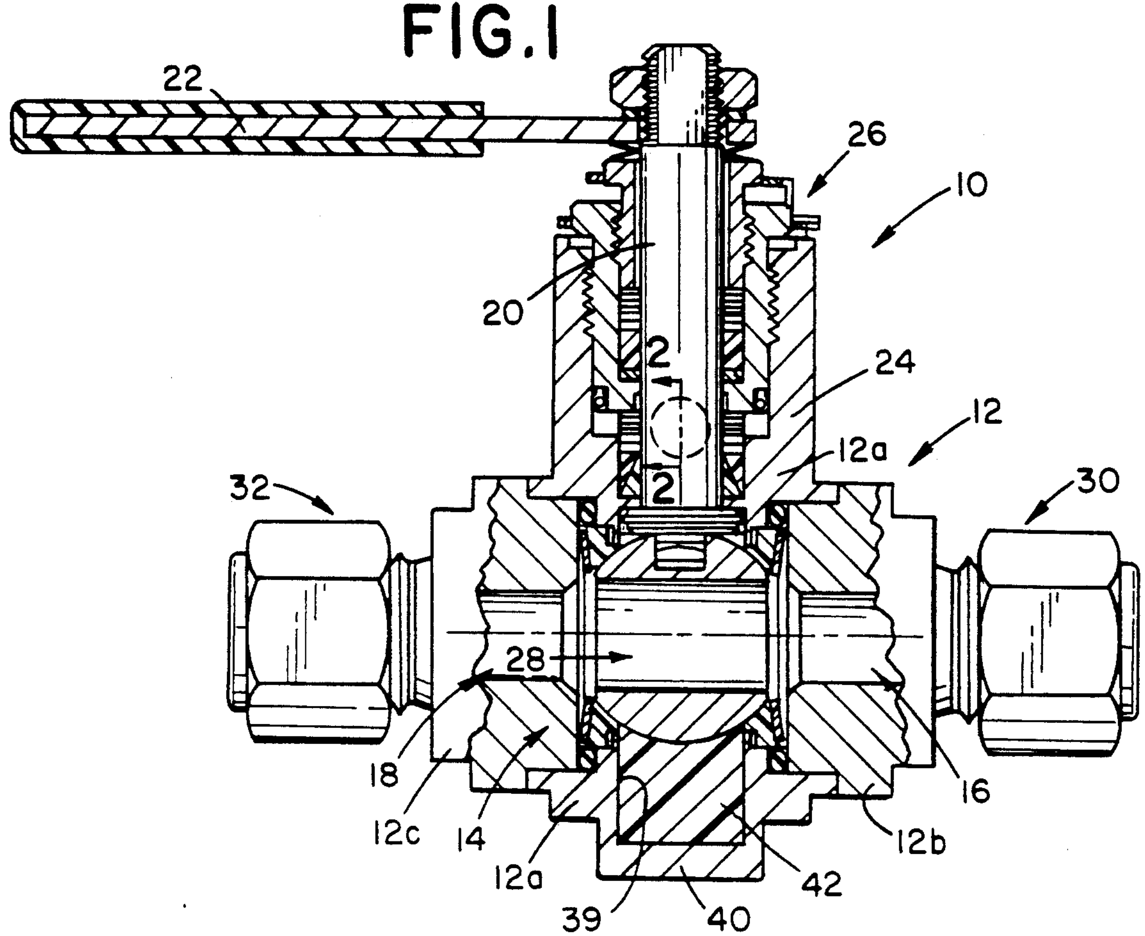
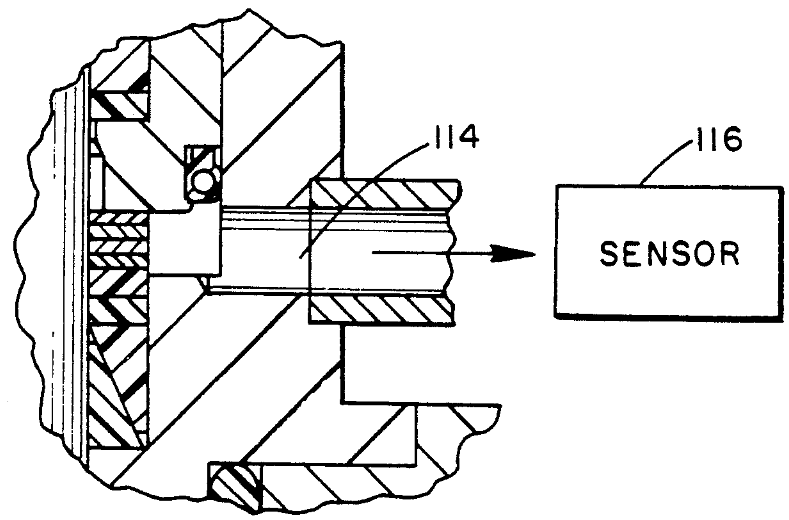
FIG.2

58
56
60
22
62
64
112
108
26
20
110
84
82
80
104
102
96
100
2
102
24
94
76
114
88
90
78
74
66
72
70
68
2
52
50
44
46
38
36
28
14
34

VALVE STEM PACKING SYSTEM

BACKGROUND OF THE INVENTION

The subject invention is directed toward the valve art and, more particularly, to an improved packing system for valve stems.

The invention is especially suited for use on ball valves and will be described with reference thereto; however, as will become apparent, the invention is capable of broader application and could be used on many different types of rotary valves.

Valves intended for use in systems handling highly toxic and dangerous fluids present special safety requirements. Leakage of any sort is, of course, unacceptable. To the extent possible, welded body construction to eliminate potential leak paths has been used. Similarly, redundant valves have sometimes been used to reduce problems with leakage past the valve seats.

One area of valve and system design which has presented special problems is with respect to valve stem packings. Welding and the use of simple static seals cannot generally provide a solution because of the need for relative movement between the stem and the valve body. While various diaphragm and bellows seals have been used, these are often extremely complex, expensive, and if ruptured can produce a sudden, relatively large and uncontrollable leak.

BRIEF STATEMENT OF THE INVENTION

As can be seen from the foregoing, a need exists for a simple packing system which reduces the possibility for leaks. The subject invention provides a packing system which not only meets the noted need but also allows continual monitoring to sense the possibility of a stem packing leak prior to its escape to the ambient atmosphere.

In accordance with the subject invention, a valve of the type including a valve body having a valve element mounted therein for controlling flow between an inlet and outlet port with a stem operatively connected to the valve element and extending out of the valve chamber is provided with an improved stem packing system. The system includes a first packing assembly carried by the valve body and positioned about the stem for sealing the valve chamber. A packing nut member is located outwardly of the first packing assembly for applying a compressive load thereto. A second stem packing assembly is mounted in the first packing nut member and encircles the stem at a location axially outwardly of the first packing assembly to define a sealed chamber outwardly of the first packing assembly. Carried in the first packing nut member is a second packing nut member which is located about the stem outwardly of the second packing assembly for applying compression load thereto. Between the first and second packing assemblies is a leakage detection means for permitting detection of any leakage which takes place from the valve chamber past the first packing assembly.

Preferably, and in accordance with a more limited aspect of the invention, the first and second packing nut members are mounted for independent adjustment to separately vary the compressive load applied to their respective packing assemblies. Preferably, the adjusting means comprises cooperating helical threads.

In accordance with a further aspect of the invention, the first packing nut member is provided with encircling seal means which seal between the first packing nut member and the valve body such that any leakage passing through the first packing assembly cannot pass to ambient atmosphere about the first packing nut member.

As can readily be seen, the use of the dual, axially spaced packing assemblies with leakage detection between the two assemblies allows ready detection of any leaks from the valve chamber prior to the time they have impacted the second packing assembly or obtained access to the ambient environment.

The particular first and second packing assemblies used in the invention can be of a variety of types and materials depending upon the particular fluids being handled by the valve. Moreover, the independent adjustability of the two packing systems allows the first packing assembly to be tightened or increased in compression upon any sign of leakage therethrough. This adjustment can take place without disturbing or removing the second packing assembly. This is possible because the second packing assembly is carried in the first packing nut member and adjustment of the first packing nut member does not change the compressive loading and sealing forces on the second packing assembly.

As is apparent from the foregoing, a primary object of the subject invention is the provision of a valve stem packing system which allows early detection and correction of fluid leakage about the valve operating stem.

A further object of the invention is the provision of a valve stem packing system wherein the forces applied to one of two packing assemblies can be adjusted and varied without affecting the setting of the other packing system.

A still further object of the invention is the provision of a system of the general type described which can be used on a variety of different types of valves handling many different materials.

BRIEF DESCRIPTION OF THE DRAWINGS

The above and other objects and advantages will become apparent from the following description when read in conjunction with the accompanying drawings wherein:

FIG. 1 is a vertical cross-sectional view through a rotary ball valve incorporating a packing assembly formed in accordance with the preferred embodiment of the subject invention;

FIG. 2 is a cross-sectional view taken on line 2—2 of FIG. 1 and showing the leak detection system; and, FIG. 3 is a greatly enlarged view of the bonnet section of the valve of FIG. 1.

DETAILED DESCRIPTION OF THE PREFERRED EMBODIMENT

Figure 3:
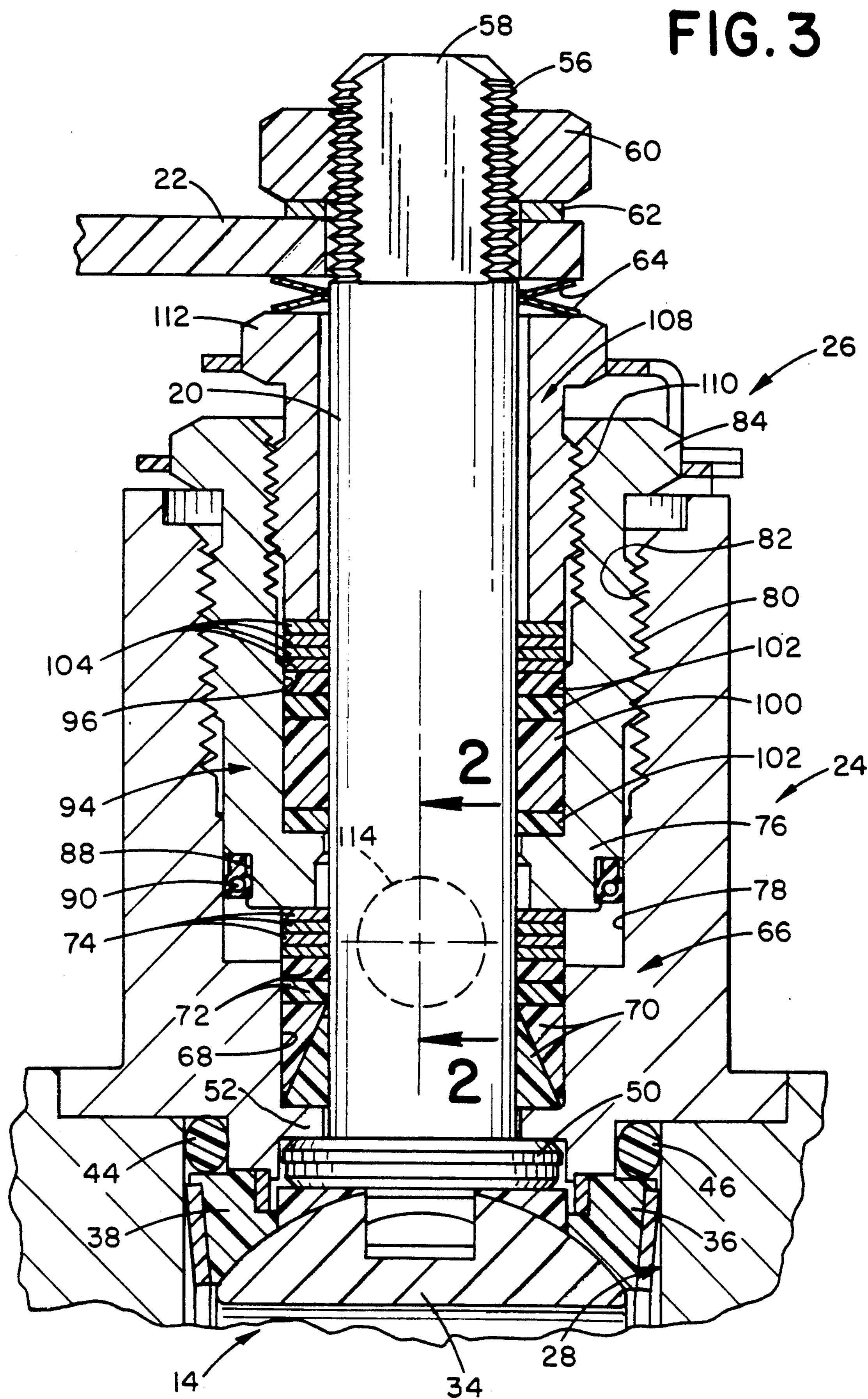

Referring more particularly to the drawings wherein the showings are for the purpose of illustrating a preferred embodiment of the invention only, and not for the purpose of limiting same, FIGS. 1 and 3 show the general overall arrangement of a rotary ball valve 10 comprising a valve body 12 carrying a ball valve element 14 which is arranged to control flow through the valve body between suitable inlet and outlet ports 16 and 18, respectively. Rotation of the ball element 14 between its open and closed position is achieved through use of a stem member 20 which extends from an operative connection with the ball element 14 to a position externally of the valve body. The stem 20 is mounted for rotation in a bonnet portion 24 of the body 12. It can be driven or rotated in any convenient manner such as through the use of a manual operating handle 22. A packing system 26 seals about the stem to prevent fluid leakage from the valve chamber.

The actual construction and arrangement of the valve body and the associated ball valve assembly form no particular part of the invention. And, as will become apparent hereafter, the inventive stem packing system could be used with many different types of rotary valves. In the subject embodiment, however, and to provide a complete description of the preferred embodiment, the valve body 12 is preferably formed from a suitable metal, such as stainless steel, and includes a vertically extending central body section 12*a* with a transversely extending cylindrical valve chamber 28. The ends of the valve chamber 28 are closed by body sections 12*b* and 12*c* which carry the previously-mentioned inlet and outlet ports 16 and 18. Suitable end fitting members 30 and 32 are provided on the body sections 12*b* and 12*c* thereby allowing the valve to be connected to the associated pipe or tubing. In the subject embodiment, the end fittings 30 and 32 are shown as conventional ferrule type fittings, although any other type of conventional end fitting could equally well be used.

The body sections 12*b* and 12*c* are joined to the central body section 12*a* in any convenient manner such as by being clamped thereto by bolts or by being positively joined by election beam welding or the like.

As best illustrated in FIG. 3, the ball valve element 14 has a central through opening 34 and is mounted in the valve chamber 28 for free rotation therein. Suitable seat ring elements 36 and 38 are positioned on opposite sides of the valve element in a conventional manner to seal thereabout. Many different types of seat rings could obviously be used, but those shown in the subject embodiment are of the type described in more detail in U.S. Pat. No. 4,410,165.

The lower end of the valve chamber 28 is provided with an opening 39 through which the operating stem 20 is installed during manufacture of the valve. The opening 39 is closed by an end cap or fitting 40. The fitting 40 is suitably joined such as by welding to the underside of the valve body center section 12*a*. An insert 42 is carried within the opening 39 sealed by the end piece 40. The insert 42 fills up the dead space therein. As illustrated, the insert 42 generally fills the entire space and bears against the underside of the ball element 34. Suitable O-ring seal elements 44 and 46 are, as shown in FIG. 3, positioned about the valve chamber at the locations shown and clamped between the valve body and the associated end fittings.

As previously mentioned the stem member 20 is inserted into its position in the valve body and bonnet portion 24 by being inserted through the opening 39 closed by end piece 40. As best shown in FIG. 3, the stem 20 has a cylindrical shape throughout its length and terminates at its lower end in a radially extending flange portion 50 which engages on the underside of a suitable shoulder 52. The lowermost end of the stem 20 is drivingly connected with the ball element 34 through the use of a tenon and slot arrangement which is well known and conventionally used in such valve assemblies. The upper end of the stem 20 is threaded as shown at 56 and has opposed flats 58 which provide a positive drive connection with a similarly shaped opening through the handle 22. The handle 22 is conveniently connected to the upper end of the stem in a releasable manner by a suitable threaded nut 60 and a washer 62 which bears against the upper surface of the handle 22. Beneath the handle 22 are a pair of Belleville washers or conical disk springs 64 which bias the handle upwardly.

Of importance to the invention is the stem packing system 26. As best shown in FIG. 3, the stem packing system 26 includes a first packing assembly 66 which is received in a counterbore 68 formed in the lower end of the bonnet 24. The packing assembly 66 could, as will subsequently become apparent, have many different designs and constructions within the scope of the subject invention. However, the embodiment illustrated is generally as shown in U.S. Pat. No. 4,558,874. Broadly, it includes a pair of resilient wedge-shaped seal ring elements 70 which are positioned as shown and are vertically compressed into sealing engagement with the walls of the counterbore 68 and the exterior of the stem 20 by a pair of packing compression ring elements 72. These ring elements are formed from metal or a relatively hard resinous material. Located directly above the rings 72 are suitable packing springs 74 which are Belleville or conical disk spring washers.

The packing assembly 66 is adjustably compressed by a packing nut member 76 which is received in the open upper end of chamber 78 of the bonnet 24. The nut member 76 has exterior threads 80 which cooperate with interior threads 82 in the chamber 78. The uppermost end of the nut member 76 is provided with a hex configuration 84 to allow it to be tightened into the open chamber 78. Thus, as can be seen, the lower end of the nut member 76 bears against the packing springs 74 to provide an adjustable compressive loading to the packing rings 70. Preferably, a shoulder or recess 88 is formed about the lower end of the nut member 76 and carries a conventional energized O-ring seal element 90 which functions to provide a fluid seal between the cylindrical exterior of nut member 76 and the interior of the bonnet chamber 78.

The packing system 26 further includes a second packing assembly 94. The packing assembly 94 could, like the packing assembly 66, have a variety of specific constructions differing from that specifically shown in FIG. 3. However, as shown in FIG. 3, the packing assembly 94 is located axially outward of the packing assembly 66 and is carried in the gland or packing nut member 76. Specifically, the packing nut 76 has an inwardly extending cylindrical chamber 96 through which the stem 20 extends and which defines an annular packing receiving chamber 98. Positioned in the chamber 98 are suitable packing ring elements including a resilient packing element 100 which is formed from any suitable resilient packing material depending on the particular fluids being handled by the valve. Above and below the packing ring 100 are suitable packing support rings 102 which act to confine the packing ring 100 and apply compressive loading thereto. Packing springs 104 are located above the uppermost packing ring 102 as shown. The springs 104 are conventional Belleville washers or conical disk springs. An adjustable compressive loading is applied to the packing assembly 94 by a packing nut member 108 which is received in the outer end of the annular chamber 96. Specifically, the packing nut member 108 has a generally cylindrical, annular configuration with a threaded exterior 110 that cooperates with the correspondingly threaded upper end of the chamber 96 as shown. The uppermost end of the nut member 108 is provided with a suitable hex configuration to allow it to be tightened into the position shown in chamber 96.

The two separate packing assemblies 66 and 94 are, as can be appreciated, independently adjustable by virtue of the manner in which they are separately mounted in the valve bonnet and the first packing nut, respectively. This arrangement in association with the previously mentioned seal ring 90 provides a sealed chamber between the two separate packing assemblies. Consequently, if the lower packing assembly 66 should develop a leak and fluid pass therethrough from the valve chamber, it is trapped in the sealed chamber between the two packing systems. Accordingly to an aspect of the invention, means are provided to sense any fluid leakage into this sealed area. In the subject embodiment, these means comprise a fluid sensing port 114 (see FIG. 2) which opens into the sealed area between the two packing systems. This port 114 provides means for tapping into this space with suitable electronic sensors or merely connecting a sealed line to a conventional sensing apparatus, such as diagrammatically illustrated at 116 in FIG. 2. Depending upon the type of fluids being carried by the valve, the particular sensor system could vary widely from a simple fluid detection electrodes to a more complex gas sensing unit. The important aspect of the invention is that the independently adjustable nature of the packing systems together with the sensing unit allows early detection and correction for leakage about the stem from the valve chamber itself.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. In a valve including a valve body defining a valve chamber with a valve element mounted therein for controlling flow between inlet and outlet ports, and a cylindrical stem operatively connected to the valve element and extending out of the valve chamber through a cylindrical passageway, the improvement comprising:

a first counterbore in the cylindrical passageway;

a first packing assembly carried by the body and positioned in the first counterbore about the stem for sealing the valve chamber;

a first adjustable packing nut adjustably received in first threads disposed within a second counterbore in the cylindrical passageway and located about the stem axially outwardly of the first packing assembly for applying adjustable compressive loading thereto;

a second packing assembly carried by the first packing nut and encircling the stem at a location axially outward of the first packing assembly;

a second adjustable packing nut carried in threads formed in the first packing nut and located about the stem axially outwardly the second packing assembly for applying adjustable compressive loading thereto; and, seal means disposed at a lower end of the first adjustable packing nut adjacent the first packing assembly sealing between the first packing nut and the second counterbore at a location between the threads which carry the first packing nut and the first packing assembly to provide a sealed chamber between the first and second packing assemblies such that leakage through the first packing assembly cannot pass through the first threads in the second counterbore in the cylindrical passageway.

2. The valve as defined in claim 1 wherein the seal means between the first packing nut and the valve body is a seal ring and permits free movement of the first packing nut axially of the stem.

3. The valve as defined in claim 1 wherein the second packing nut is mounted for movement axially of the stem and there are adjusting means for adjusting the position of the second packing nut relative to the first packing nut.

4. The valve as defined in claim 1 wherein there are leakage detecting means including a fluid port opening through the valve body to the sealed chamber between the first and second packing assemblies.

* * * * *